Oct. 27, 1936. W. E. BROEG 2,058,662
BAKING PAN
Original Filed Feb. 11, 1932

Inventor:
William E. Broeg
Attorney

Patented Oct. 27, 1936

2,058,662

UNITED STATES PATENT OFFICE 2,058,662

BAKING PAN

William E. Broeg, Peoria, Ill.

Original application February 11, 1932, Serial No. 592,311. Divided and this application December 29, 1932, Serial No. 649,251

1 Claim. (Cl. 53—6)

This invention relates to food product containers and baking pans.

The object of this invention is to provide a simple, economical container which may be used as a portion of a package in which baking products are shipped and may also be used as a baking pan. This combination makes it possible to ship uncooked bakery products in a light, inexpensive container and place the product and container directly in the oven so that baking or cooking may progress without any individual handling whatever. Other objects of this invention are to provide a pan or container which will be extremely light and which because of its low value, may be thrown away when it has been used.

My invention also aims to provide means for locating and retaining the food product in a definite position on the pan or container even when the pan is tipped or moved. Other objects of my invention will be evident from the drawing, specification and claim which forms a part of this application.

This application is a division of my co-pending application filed February 11, 1932, Serial No. 592,311.

Referring to the drawing, Figure 1 shows a side elevation partly in section of the box or container enclosing a multiple of lumps of uncooked bakery products and a multiple number of my containers which serve as spacers and separators.

Figures 1, 2, 3:
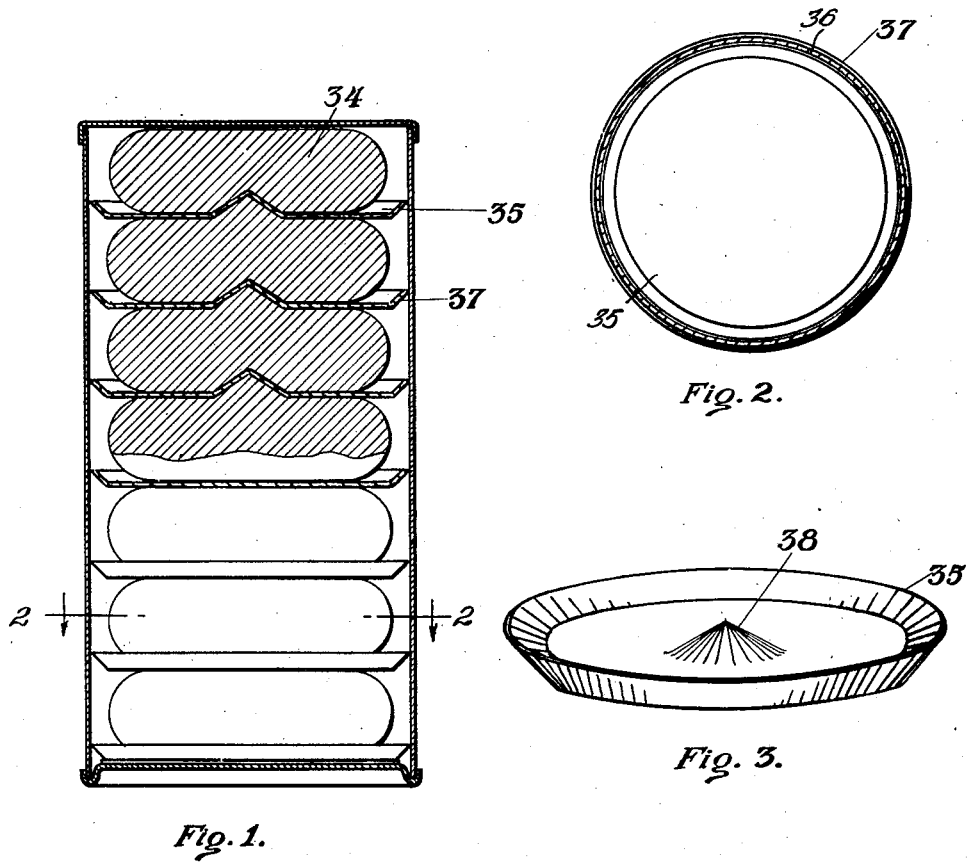
Figure 2 shows a section view of a typical container.
Figure 3 shows in perspective a container of my invention.

Referring to the drawing, in Figure 1, 34 indicates a typical lump of biscuit dough resting upon a container 35 in package or box 36.

In Figure 2, 37 indicates the rim or upturned edge of a pan made in accordance with my invention. It will be noted this rim or edge is sectioned and that the body of my pan is, therefore, formed from a central layer of material which may for example be dense cardboard or heavy fiber and a layer of very light sheet metal is placed on both sides.

In Figure 3, central raised conical projection 38, indicates a non-skid construction which is designed to prevent lumps of dough or the cooked product from moving about on the surface of the pan during handling and either before or after baking.

In my preferred construction the container is formed from a light coating of sheet aluminum over a heavy cardboard or paper plate. My invention, however, is not confined to sheet aluminum as sheet copper, sheet steel or tinfoil may be employed. Another alternate form of construction is obtained by spraying the fiber or paper base with sodium silicate, gypsum or similar hardening surface agents and then applying a coating of metallic foil. My baking pan or container may also be employed as a plate for serving the baked product after cooking.

It will be obvious that my invention may be applied to various types of products such as pies and biscuits, whether leavened with yeast or baking powder. Also doughnuts, butter-rolls, cookies and the like may be shipped, handled, cooked and served in pans which come within the scope of this invention.

Having now fully described my invention what I claim as new and wish to secure by Letters Patent in the United States is as follows:

A bake pan for dough products formed with a horizontal circular bottom portion, a continuous circular inclined up-standing edge portion, a small centrally located conical projection in the bottom, said pan being formed from fibrous material coated on both surfaces with metal foil.

W. E. BROEG.